SIDNEY LOEB &
SRINIVASA SOURIRAJAN,
INVENTORS.

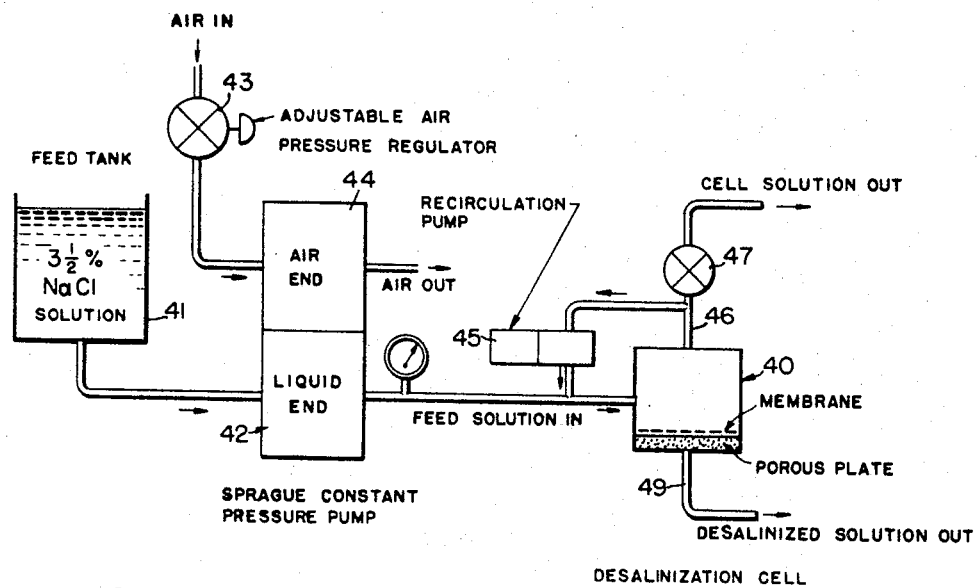
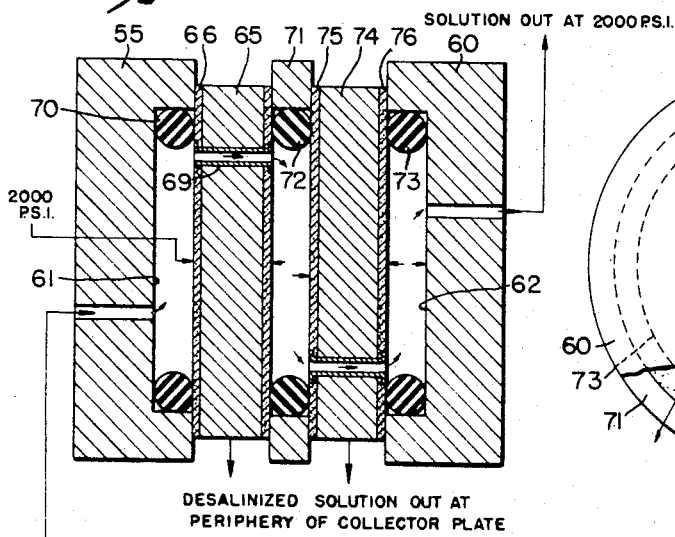
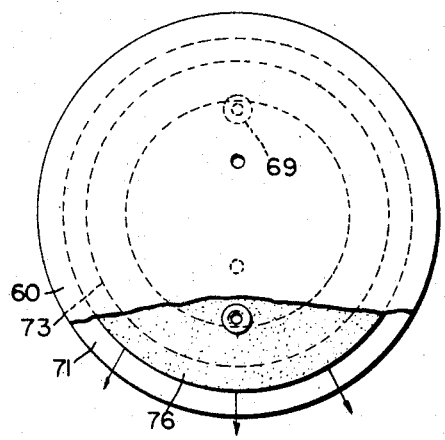

*Fig. 6*
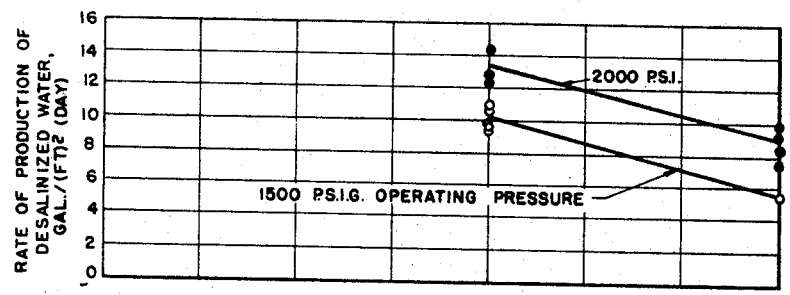
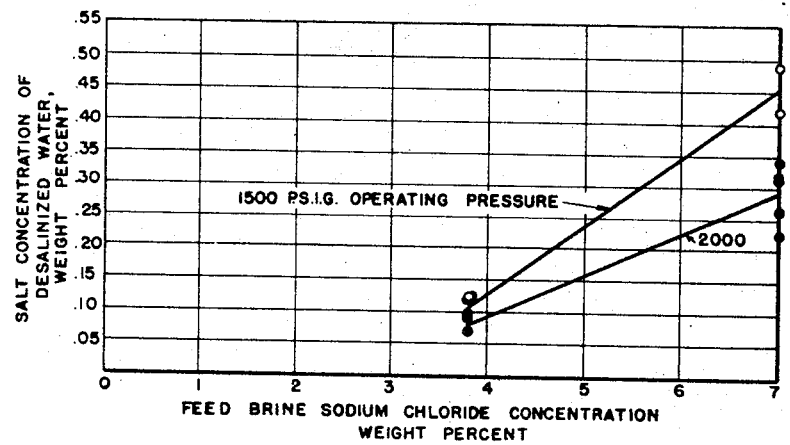
EFFECT OF FEED BRINE SALT CONCENTRATION
AND CELL OPERATING PRESSURE ON SALT
CONTENT AND FLOW RATE OF PRODUCT

SIDNEY LOEB
SRINIVASA SOURIRAJAN
INVENTORS

United States Patent Office

3,133,132
Patented May 12, 1964

3,133,132
HIGH FLOW POROUS MEMBRANES FOR SEPARATING WATER FROM SALINE SOLUTIONS
Sidney Loeb and Srinivasa Sourirajan, Los Angeles, Calif., assignors to The Regents of the University of California, Berkeley, Calif., a corporation
Filed Nov. 29, 1960, Ser. No. 72,439
20 Claims. (Cl. 264—49)

This invention relates to the demineralization of saline waters including sea water, and other waters containing various levels of dissolved inorganic salts. While the invention has great utility for this particular purpose, it is not limited thereto but may find application and utilization in the separation of various chemicals where a solute is to be separated from a solution, for example, in biomedical research for filtration of viruses, proteins, and other such material.

The invention will be described herein having particular reference to the demineralization of saline waters and phenomena related thereto.

The process utilizes film membranes having particular permeability and surface properties. The membrane is, in accordance with common usage, referred to frequently as porous. However, the words pore and porous as usually used herein refer only to the fact that the membrane has a structure which allows an appreciable rate of passage of fresh water under suitable conditions. The words permeability and permeable are used with a similar connotation.

The salt water is pushed against such a film membrane by the application of hydraulic pressure under which conditions, it is found that the water escaping through the film is considerably enriched in fresh water. The process consists in pushing the water under pressure through a medium or film membrane, (1) containing a permeable structure of particular or adequate size within the material of the medium and/or on the surface of the medium in contact with the saline water, (2) whose bulk material and/or material of the surface of the medium in contact with the saline water, is of a chemical nature capable of passing water through the permeable structure at a higher rate than dissolved salts. These characteristics of the material will be particularized in more detail hereinafter.

The flow of the fluid through the porous medium is effected by the application of hydraulic pressure on the saline water side. The saline water under pressure may be kept turbulent during the process in order to prevent the accumulation of a high salt concentration near the porous medium. The degree of demineralization obtainable, and the rate of production of the demineralized water depend upon several factors which include, (1) the bulk concentration of the salts in the saline water in contact with the porous medium, (2) the physical nature of the permeable structure in the porous medium, (3) the chemical nature of the porous medium and/or its surface in contact with the saline water, (4) the degree of agitation of the saline water in contact with the porous medium, and (5) the pressure used for filtration.

The process depends on the existence of semi-permeable osmotic membranes; that is, membranes which are permeable to solvent, but not to solute. Practical membranes for solutions of salt in water have not heretofore been developed. If a solution is placed on one side of the membrane, and pure water on the other, water will diffuse from the pure water side through the membrane to the salt water side. This flow can be prevented by exerting osmotic pressure, on the salt water. If a pressure higher than the osmotic pressure is exerted on the salt water, the flow can be reversed, and pure water will be removed through the membrane from the salt solution. For sea water the osmotic pressure is about 350 pounds per square inch; it is less for less saline waters.

The process further depends on the fact that the semi-permeable character of desalinizing membranes appears to be a function of both the physical nature of the permeable structure and chemical structure in the membrane. The dual requirements of correct membrane chemical structure and permeability structure must be met in order for the process to operate successfully.

A functioning apparatus or plant based on the process is also disclosed herein. In such a plant, the pressure of the salt water is raised above the osmotic pressure. The high pressure water then passes into a membrane stack, where part of it passes through the membranes as purified water; the remainder, now saltier than originally, is discarded. Since it will still be under high pressure, however, it is passed through a turbine to recover as much as possible of the energy put into it by the pump. The provision of such a membrane which has a life long enough to produce significant quantities of fresh water by the means provided herein offers a solution to the economic problem of commercial sea water conversion.

The invention herein is particularly directed to a new and original porous membrane capable of desalinizing brine solutions at much higher flow rates of the desalinized water than has been found possible by use of porous membranes known to the prior art. A further object of the invention is to provide new, original, and improved processes for fabricating the porous membranes of the invention.

The membranes of this invention have been found capable of reducing the concentration of a 5.25% sodium chloride solution to about 500 parts per million in a single pass at a flow rate on the order of 8 gallons/ft.$^2$ of membrane surface per twenty-four hour day under a pressure differential of 1500 p.s.i.g., the membranes having been approximately 1½" and 4¼" in diameter, respectively, and approximately .004" in thickness. The membranes receive a permanent set or strain such that their final thickness may be .0025".

Another object is to provide a membrane made porous by the inclusion of water in the membrane, said water having been included in the original casting solution, which contains also cellulose acetate, a suitable solvent, and a perchlorate salt, the function of the last being to maintain a relation between the water and the cellulose acetate such that in the ultimately produced film the desired water-cellulose acetate organization can be obtained.

A further object is to provide a method of forming films or membranes as in the foregoing object including the steps of cooling the solution before casting; thereafter evaporating the solvent from the cast film for a predetermined period after which the film is immersed in water and thereafter heating the film, if necessary for the specific salt separation requirement.

Another object is to provide a method of forming films or membranes as in the preceding objects wherein the solvent is selected from a group comprising acetone, methyl ethyl ketone, ethyl alcohol, and/or methyl alcohol.

Another object is to provide a method of forming membranes as in the foregoing wherein the ratio of the solvent to the cellulose acetate is 2/1 or greater by weight and the ratio of aqueous perchlorate salt solutions, and magnesium perchlorate solutions in particular, to the cellulose acetate is between 1/1 and 1/3 by weight.

Another object is to provide and make available membranes produced in accordance with the methods referred to in the foregoing objects.

Another object is to separate solvents from solutions by a process of reverse osmosis utilizing the membranes referred to in the foregoing objects.

Other objects include provision of methods of fabricating membranes as in the foregoing objects utilizing particular temperatures and times in the cooling, casting, and heating steps as indicated herein; provision of new and novel means and methods of utilizing the new and novel subject membranes; and provision of new and novel membrane materials which are treated to improve the permeability structure.

Further objects and additional advantages of the invention will become apparent from the following detailed description and annexed drawings, wherein:

FIG. 3 is a diagrammatic view of a filtering system having the cell of FIG. 1 embodied therein;

FIG. 4 is a diagrammatic view of a commercial or plant type cell embodying membranes of the invention;

FIG. 5 is an end view partially broken away of the cell of FIG. 4;

FIG. 6 are graphs showing the effect on the results of operation utilizing membranes of the invention;

Figure 1:
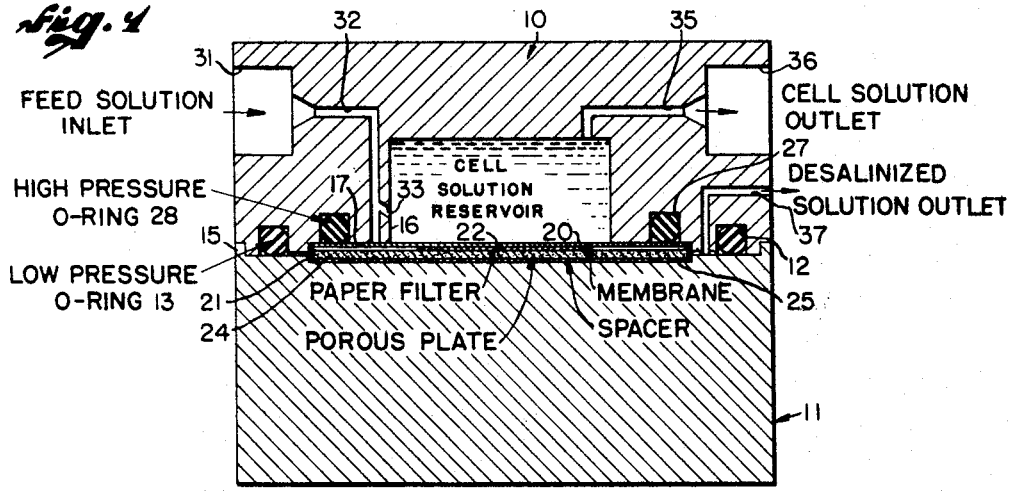
FIG. 1 is a diagrammatic view of a form of filtering cell in which a membrane of the invention may be embodied.

The invention involves the preparation of a film casting solution from which a film is cast and then treated and prepared as herein described. To provide an understanding generally of the method of preparing the films or membranes, it may be pointed out at the outset that the film casting solution from which the films are cast contains a pore producing agent (i.e., this agent produces a structure which allows appreciable rate of passage of fresh water under suitable conditions) of the nature of aqueous perchlorate salt solution in a suitable ratio to a film material such as cellulose acetate. Magnesium perchlorate is preferred but other inorganic perchlorate salts may be utilized, such as sodium perchlorate salts. A solvent, preferably acetone, is added to prevent the solution from becoming too viscous. Methyl ethyl ketone, ethyl alcohol and/or methyl alcohol may also be used but not as efficaciously, as the solvent or solvents. The film material may also be other cellulosic esters and cellulosic derivatives.

Next film casting and subsequent solvent evaporation into air is accomplished most conveniently and efficiently, but not essentially, at reduced temperatures to reduce the solvent evaporation rate and permit effective initiation of the desired organization of the water-cellulose acetate structure; then, after a predetermined time such that the solvent is not completely evaporated, the film is immersed in water, preferentially but not essentially ice water, to prevent complete air drying of the film.

Complete air drying has been found to be harmful in that it reduces the desalinizing capacity of the film and is believed to damage the water-cellulose acetate structure which has been initiated. Finally, the film is preferably heated prior to use to complete the organization of the film for high flow desalinization of sea water.

For certain applications, where the ions to be separated are large relative to those predominant in sea water it would not be necessary to heat the film.

The following is a more detailed description of a specific preferred example of the formation of the solution and casting, treatment, and preparation of the film in accordance with this invention. A solution is prepared containing components as follows:

(A) Aqueous magnesium perchlorate. The concentration of magnesium perchlorate in this aqueous solution may be varied from 5% by weight up to saturation concentration, approximately 50% by weight of $Mg(ClO_4)_2$. The 10% concentration is preferred. As the aqueous concentration of magnesium perchlorate is increased above this figure, the flow rate of the water through the completely treated membrane is progressively reduced. If the water is omitted completely from the casting solution, the flow rate from the subsequently made film is very low, and, in the two tests made, did not appear to be influenced by the amount of magnesium perchlorate present. At aqueous concentrations below 10%, there is inadequate magnesium perchlorate to maintain the desired relation between water and cellulose acetate such that in the film the desired organization can be obtained. The aqueous magnesium perchlorate solution is referred to as MP hereinafter.

(B) Cellulose acetate containing preferably 54–56% by weight of combined acetic acid (CA).

(C) Acetone (A).

The proportions of these materials in the above solution is subject to some variation. However, the region wherein best results are obtainable is found to be that wherein:

(1) The ratio of A to CA is to be between 2/1 and 4/1 by weight.

(2) The ratio of MP to CA is to be between 1/1 and 1/3 by weight.

A preferred and representative solution is MP, 11%; CA, 22% and A, 67%.

Another representative solution is a mixture of cellulose acetate, acetone, water and magnesium perchlorates in the percentages 22.2, 66.7, 10.0, and 1.1, respectively.

By way of example:

The casting was accomplished on glass plates with runners on the sides thereof, of a thickness, i.e., height, above an associated glass plate to maintain the desired thickness of casting. Preferred runner thicknesses are approximately 0.010 inch for a film of approximately corresponding thickness. The solution was cooled in a cold box to a temperature of approximately $-7.5°$ to $-16°$ centigrade before casting along with the plates on which the film was cast. The film was cast by means of a doctor blade or knife which rested on the raised runners at the edges of the glass plate. The doctor blade guided on and by the suitably spaced runners was pulled across the plate in predetermined spaced relationship thereto at a rate such that the entire width of the plate which was 8 inches (representatively) was accomplished is about .17 minutes although this time range has been varied from .13 to .25 minutes without adversely affecting the results. Too slow a period of time permits excessive evaporation. Too fast a sweep time results in imperfect surface formation or even rupture of the film. The doctor knife also served as the back wall of an open-bottomed box, one half inch high, filled with 40 cubic centimeters of casting solution, prior to casting. During casting, about 35% of the solution was spread on the plate, leaving enough solution in the box so that the static head available for flow under the knife did not decrease excessively as the knife was pulled from one end of the plate to the other.

After casting the film on the plate, solvent evaporation was allowed to proceed in a cold box at $-7.5°$ to $-16°$ centigrade (optimum $-11°$ C.). It was allowed to remain in the cold box at the same temperature for a period of from 2 to 4 minutes to permit evaporation of a major portion of solvent and initial organization of the film after which it was immersed in water at approximately $1°$ to $5°$ centigrade. This completed removal of the solvent by diffusion into the water and probably some of the magnesium perchlorate. The time of 2 to 4 minutes between casting and immersion was critical. Too short a time prevented the formation of a firm film. Too long a time prevented the film from having good desalinization qualities. Therefore, it is clear that the primary function of the immersion is not to extract the aforementioned materials, but to contribute to obtaining the film structure necessary for optimum results. The optimum time appeared to be 3 minutes.

The optimum permeability structure in the finished membrane apparently need not necessarily be the same for all desalinizing membranes; it can vary especially depending upon the chemical nature of the membrane and saline water solution.

The thickness of the finished films is not critical in view of the apparent surface nature of the barrier effect. A film of membrane of the order of .004 inch is appropriate.

The treatment by heating is critical, the optimum temperatures being as stated herein.

A preferred technique for heating the films consists in setting them or placing them under water on glass plates which are separated by washers, as of brass, about 1/32″ thick, that is, with one on top of another. The brass washers merely keep the top glass from bearing directly on the film. The assembly is then heated up as on a hot plate. The film after heating in the water bath is left there for a period of time before being taken out to use. The water bath is between 77° and 83° centigrade and the optimum temperature is 82° centigrade. It is preferable to heat the water up to the desired temperature for about ½ hour gradually. The water may be put in at 50° centigrade and then heated up to about 82° centigrade and held for at least approximately an hour but can be left overnight or longer and then allowed to cool.

The foregoing results in what may be described as an opalescent film in that it is transparent but has a certain characteristic opalescent appearance. It has a porosity, i.e., ratio of open volume to total volume, in the order of 25% to 40%. A significant aspect of the film is that one side is useful whereas the other side is not. The side which is away from the glass plate during casting is the side which must be used against the salt solution. The other side is assembled against a porous plate as referred to more in detail hereinafter.

Tests have been carried out in both a laboratory scale and a bench scale test cell providing: (1) a constant high pressure on the saline water in contact with one side of the porous medium, (2) a continuous source of flowing or turbulent food saline water to the high pressure side of the porous medium, (3) a valve for the continuous or intermittent removal of concentrated solution to prevent the accumulation of salt concentration in the cell, and (4) a means of exit for the demineralized water to the outside of the cell at atmospheric pressure.

Best results are obtained when the pressure on the concentrated brine is increased to the operating pressure in one or more stages rather than all at once. For example, if the operating pressure will finally be 1500 p.s.i.g., it is desirable first to maintain 1000 p.s.i.g. for about one half hour; then after one half hour, increase it to 1500 p.s.i.g. If desired, it may be increased to 2,000 p.s.i.g., at least one hour later.

Figure 2:
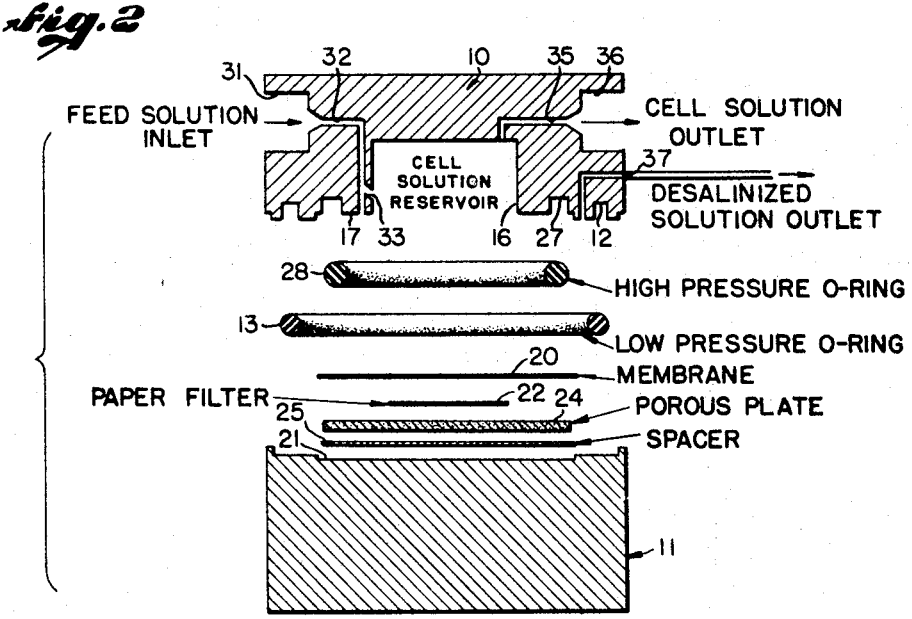
FIG. 2 is an exploded view of the cell of FIG. 1.

FIG. 1 shows diagrammatically such a form of apparatus or test cell in which tests were run. The apparatus is shown exploded in FIG. 2. In these figures, the apparatus comprises an upper plate 10 and a lower plate 11.

The upper plate has an annular groove 12 in which is an O-ring 13 which seals the plates together. The lower plate has a flange or shoulder 15 which interfits with a corresponding shoulder on the plate 10.

The plate 10 has a central opening or bore 16 and a somewhat enlarged counterbore 17 of relatively shallow depth in which is received the membrane or film member 20. The plate 11 has a circular recess or depression 21 of the same diameter as the counterbore 17 so that these spaces when matched form a cylindrical opening as shown. In this space in addition to the membrane 20 is a paper filter or spacer member 22 which is between the membrane 20 and a porous plate or disc 24 which may be of suitable material such as stainless steel as described hereinafter. The paper filter facilitates easy transmission of demineralized water to the porous plate. The porous plate 24 fits against spacer member 25 which is in the bottom of the depression or space 21. The plate 10 has an annular groove 27 in which is disposed a sealing O-ring 28 which seals the peripheral edges of the membrane 20.

Numeral 31 designates an opening in the plate 10 for the inlet of the feed water or solution which passes through channel 32 which has a branch 33 leading to the solution reservoir 16. Passage 32 also communicates directly with the membrane 20. Numeral 35 designates an outlet passage from the reservoir 16 for withdrawing solution from the cell at the outlet therefrom 36. The demineralized water as described filters through the membrane 20 of the cell into the central circular space and to the porous plate 24. It is drained out of porous plate 24 to the desalinized solution outlet 37.

FIG. 3 shows the system utilized with the cell of FIG. 1 and in which the membranes have been tested. The test cell is shown generally at 40 and a source of 3½ percent salt solution is shown generally at 41.

The salt solution is pressurized in the cell 40 by pressure pump means 42 which may be a reciprocating pump 44 driven by air pressure applied through a pressure regulator 43 as shown. Preferably, the solution in the cell 40 is re-circulated by a pump as shown at 45. More concentrated solution is withdrawn from the cell through conduit 46 and valve 47. The desalinized solution is withdrawn from the cell through the outlet 49.

Figure 7:
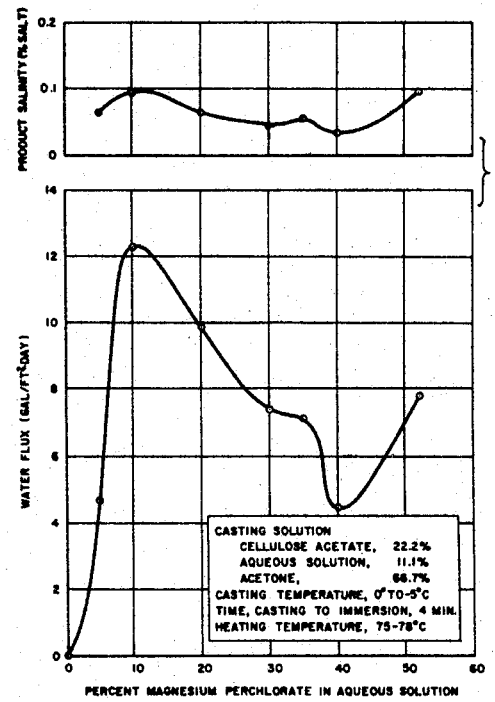
FIG. 7 is a graph showing the effect of the magnesium perchlorate.
Figure 8:
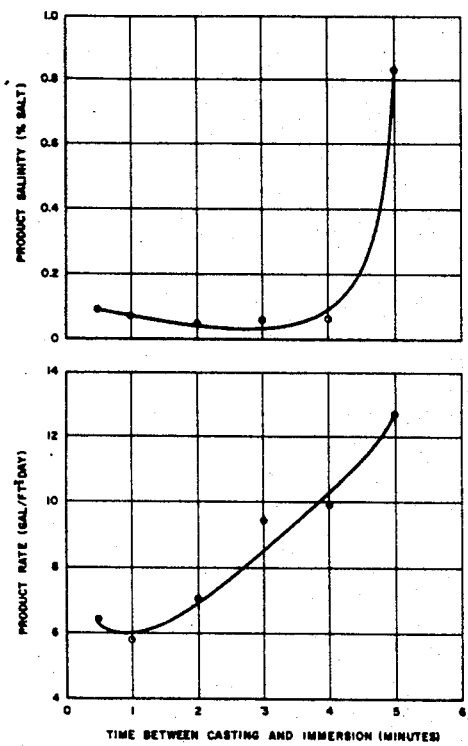
FIG. 8 is a graph showing the effect of the time intervals between casting and immersion.

The results summarized in Table I were obtained in a laboratory scale test cell as shown in FIG. 1. Approximately 3.5 percent solution of sodium chloride in water was used as the saline water in all experiments. The graphs, FIG. 6, illustrate characteristic results of operation of the invention in a cell such as shown in FIG. 1. FIG. 7 illustrates the result of varying the percentage content of perchlorate salts (i.e.) magnesium perchlorate in aqueous solution. As will be noted above 10% of the rate of fresh water production decreases. FIG. 8 illus-

*Table I*

| Film No. | Casting Solution Composition, Percent | | | | Thickness of Film as Cast, Inches | Thermal Treatment Temperature, ° C. | Time between casting and immersion in water, Minutes | Flow Rate (gal.)/(ft.)² (day) | Desalinized water salt content, Percent |
|---|---|---|---|---|---|---|---|---|---|
| | $Mg(ClO_4)_2$ | $H_2O$ | Cellulose Acetate (398-3) | Acetone | | | | | |
| 3C | 4.5 | 4.5 | 18.2 | 72.8 | 0.015 | 74 | 6 | 20 | 0.420 |
| 3A | 4.5 | 4.5 | 18.2 | 72.8 | 0.015 | 83 | 6 | 10 | 0.124 |
| 9B | 4.5 | 4.5 | 18.2 | 72.8 | 0.015 | 83 | 10 | 12 | 0.42 |
| A2 | 4.5 | 4.5 | 18.2 | 72.8 | 0.010 | 74 | 6 | 17 | 0.1025 |
| A1 | 4.5 | 4.5 | 18.2 | 72.8 | 0.010 | 83 | 6 | 9 | 0.080 |
| 2B | 4.5 | 4.5 | 18.2 | 72.8 | 0.015 | 74 | 6 | 8.9 | 0.185 |
| 2A | 4.5 | 4.5 | 18.2 | 72.8 | 0.015 | 83 | 11 | 4.3 | 0.070 |
| 1A | 5.6 | 5.6 | 22.2 | 66.6 | 0.015 | 83 | 6 | 2.0 | 0.043 |
| 1A | 4.5 | 4.5 | 18.2 | 72.8 | 0.007 | 74 | 1 | 11 | 0.246 |
| 1A | 5.6 | 5.6 | 22.2 | 66.6 | 0.007 | 83 | 1 | 6.8 | 0.159 |
| 2A | 5.6 | 5.6 | 22.2 | 66.6 | 0.007 | 83 | 3 | 4 | 0.216 |

(1) Casting temperature, 11°–15° C.
(2) Immersion water temperature, 30°–31.5° C.
(3) Time at thermal treating temperature, 1 hour.
(4) Operating pressure, 1500 p.s.i.g.
(5) Feed solution, 3.5 percent NaCl.

trates the effect of varying the time interval between casting and immersion.

The films fabricated in accordance with the method and techniques as described may be used in a commercial or plant type of assembly as shown in FIG. 4. A cell may consist of a stainless steel porous plate upon which the film rests with the salt water over the top of the film itself. The seals are O-rings and the arrangement is that the saline solution circulates through the cells over the top of the film. Circulation is important both in improving the rate and in improving the desalinization of the water.

The cell is enclosed by plates 55 and 60 having circular depressions as shown at 61 and 62. The plate 55 has adjacent to it a plate 65 which is a collector plate made of stainless steel preferably, about ⅛ inch thick and between this plate and the opening 61 is the semi-permeable or porous membrane 66 about 0.005 inch thick sealed by O-ring 70.

The incoming liquid to be desalinized may enter at a pressure of 2,000 lbs. per square inch and may for example have in it 3½% of sodium chloride. Numeral 69 represents a channel through the collector plate 65 so that the water to be desalinized passes into an intermediate cell 71. This cell is also sealed by an O-ring 72 around the periphery of an opening in plate 71. Numeral 60 represents another end plate like the one 55 having a depression 62 in it sealed by O-ring 73. Separating the plates 60 and 71 is another stainless steel collector plate 74 which is porous and there being semi-permeable membranes 75 and 76 between this collector plate and the plates 60 and 71. The pure water which is filtered out of the salinized water is collected in the pores in the collector plate and drains out therefrom at the bottom.

It has been found that one important requirement for readying the films for service is to increase the pressure in stages rather than all at once to the final pressure. For example, a preferred staging for a final pressure of 2,000 lbs. per inch in 1,000 lbs. for half an hour, 1500 lbs. for an hour and half, 2,000 lbs. from then on.

Results include a production rate of 8 gallons per square foot of film per day. The feed solution was 5¼% sodium chloride. It may be said that sea water is 3½% total salts. Accordingly, the feed of 5¼% would correspond to a ratio of rejected sea water brine, of 5¼% concentration, to water produced of 2 to 1. These results were obtained at a total pressure of 1500 lbs. per square inch and the circulation rate on the apparatus used of 6 gallons per hour. The salt concentration of the water produced was 500 parts per million.

Referring again to the characteristics of the cast film, it is to be pointed out that once the film is made, that is, that once it is immersed in water, it should always be kept in a completely wet condition. If the film is allowed to dry at any time, it will physically shrink on the order of 20 or 30% of its former size and loses its desalinizing effectiveness.

From the results described, it is clear that saline water can be demineralized by pressure filtration through suitable porous membranes of the character described and equivalent means and methods, and the rate of production of demineralized water by the above means and methods has practical industrial significance.

The foregoing disclosure is representative of preferred forms of the inventions and is to be interpreted in an illustrative rather than a limiting sense, the invention to be accorded the full scope of the claims appended hereto.

What is claimed is:

1. A method of preparing a porous membrane adapted to separate solutes from solution, comprising:
   (a) dissolving a film forming cellulosic ester and an aqueous solution of a pore producing perchlorate salt in an organic solvent;
   (b) casting said solution to form a membrane of substantially uniform thickness;
   (c) evaporating a portion of said organic solvent for a predetermined period of time; and
   (d) immersing the cast membrane in water to remove said perchlorate salt.

2. A method as stated in claim 1 which includes heating the cast membrane in water.

3. A method as stated in claim 2 wherein the water is heated to a temperature in the range of about 77° C. to 83° C.

4. A method as stated in claim 1 wherein the casting and evaporating are accomplished with said solution cooled below room temperature.

5. A method as stated in claim 4 wherein said solution is cooled to the temperature range of about −16° C. to −7.5° C.

6. A method as stated in claim 1 wherein said cellulosic ester is cellulose acetate.

7. A method as stated in claim 1 wherein said perchlorate salt is magnesium perchlorate.

8. A method as stated in claim 1 wherein said perchlorate salt is sodium perchlorate.

9. A method as stated in claim 1 wherein said organic solvent is acetone.

10. A method as stated in claim 1 wherein the weight ratio of organic solvent to cellulosic ester is between about 2/1 to 4/1.

11. A method as stated in claim 1 wherein the weight ratio of aqueous perchlorate salt solution to cellulosic ester is between about 1/1 to 1/3.

12. A method as stated in claim 1 wherein the concentration of the perchlorate salt in said aqueous solution is in the range of about 5% by weight to saturation.

13. A method of preparing a porous membrane adapted to separate solutes from solution, comprising:
   (a) dissolving cellulose acetate and an aqueous solution of magnesium perchlorate in acetone, the weight ratio of acetone to cellulose acetate being about 3/1 and the weight ratio of the aqueous magnesium perchlorate solution to cellulose acetate being about 1/2 with the concentration of magnesium perchlorate in said aqueous solution being about 10% by weight.
   (b) casting said solution to form a membrane of substantially uniform thickness;
   (c) evaporating a portion of said organic solvent for a predetermined period of time, said casting and evaporating being accomplished in a temperature range of about −16° C. to −7.5° C.;
   (d) immersing the cast membrane in water to remove said perchlorate salt; and
   (e) heating said cast membrane in water to a temperature in the range of about 77°C. to 83° C.

14. A method of preparing a porous membrane adapted to separate solutes from solution, comprising:
   (a) dissolving a film forming cellulosic ester and an aqueous solution of a pore producing salt in an organic solvent;
   (b) casting said solution to form a membrane of substantially uniform thickness;
   (c) evaporating a portion of said organic solvent for a predetermined period of time, said casting and evaporating being accomplished with said solution cooled below room temperature; and
   (d) immersing the cast membrane in water to remove said pore producing salt.

15. A method of preparing a porous membrane adapted to separate solutes from solution, comprising:
   (a) dissolving a film forming cellulosic ester and an aqueous solution of a pore producing salt in an organic solvent;
   (b) casting said solution to form a membrane of substantially uniform thickness;
   (c) evaporating a portion of said organic solvent for a predetermined period of time;
   (d) immersing the cast membrane in water to remove said pore producing salt; and
   (e) heating the cast membrane in water.

16. A method of preparing a porous membrane adapted to separate solutes from solutions, comprising:
   (a) dissolving a film forming cellulosic ester and an aqueous solution of a pore producing salt in an organic solvent;
   (b) casting said solution to form a membrane of substantially uniform thickness;
   (c) evaporating a portion of said organic solvent for a predetermined period of time, said casting and evaporating being accomplished with said solution cooled below room temperature;
   (d) immersing the cast membrane in water to remove said pore producing salt; and
   (e) heating the cast membrane in water.

17. A method as stated in claim 16 wherein said cellulosic ester is cellulose acetate.

18. A method as stated in claim 16 wherein said cellulosic ester is cellulose acetate and said organic solvent is acetone.

19. A method as stated in claim 14 wherein said cellulosic ester is cellulose acetate.

20. A method as stated in claim 15 wherein said cellulosic ester is cellulose acetate.

References Cited in the file of this patent

UNITED STATES PATENTS 2,884,387    Bieber et al. _____ Apr. 28, 1959

OTHER REFERENCES

"Separation and Purification," vol. III, part I, Interscience Publishers, Inc., New York (1956), pages 713–718. (Copy in Scientific Library.)

Bulletin de la Societe Chemique de France 3, 1936, pp. 312–318, "The Perchlorates as Solvents of Cellulose and of its Derivatives" by A. Dorby.